United States Patent Office 3,008,934
Patented Nov. 14, 1961

3,008,934
FILAMENT AND FILM FORMING INTERPOLYESTERS OF BIBENZOIC ACID, CERTAIN AROMATIC ACIDS AND A DIHYDRIC ALCOHOL
Edward A. Wielicki, Philadelphia, and Robert D. Evans, West Chester, Pa., assignors to American Viscose Corporation, Philadelphia, Pa., a corporation of Delaware
No Drawing. Filed July 28, 1958, Ser. No. 751,171
5 Claims. (Cl. 260—75)

This invention relates to new and useful interpolyesters, shaped articles prepared therefrom and methods of preparing the same. More particularly it is directed to unique interpolyesters of bibenzoic acid, a glycol and another aromatic dicarboxylic acid. This invention relates further to films, fibers, molded products, coatings and other shaped articles prepared from the unique interpolyesters described above.

The history of polyesters is a relatively short but active one. Condensation polyesters, while encountered in early researches such as those of Lourenco, Bischoff, Fischer, etc., were not intensively studied until 1928, when Carothers and coworkers began a systematic study of condensation polymerization. Illustrative of Carothers' work is U.S. Patent No. 2,071,250 (1937), which discusses some of the previous work in the field and some of the problems in drawing polyesters into fibers. Carothers produced filaments from his polyesters, but they were low-melting and lacked hydrolytic stability.

The current prior art describes various linear condensation polyesters derived from dihydroxy compounds and dibasic acids, such as terephthalic acid, which are capable of being drawn into fibers showing, by characteristic X-ray patterns, orientation along the fiber axis. However, in using a single glycol and single acid to prepare a polyester, one is limited to a fixed crystal structure and melting point since the constitution of the polymer cannot be varied.

In recent years a limited amount of work has been done involving bibenzoic acid and its esters in connection with homopolyesters. The prior art indicates, however, that this work was not generally fruitful, for a homopolyester of bibenzoic acid and a glycol (e.g. polyethylenebibenzoate) possesses an extremely high melting point making its use in shaped articles entirely impractical, particularly when attempts were made to use it as a film or fiber-forming material. Moreover, and possibly more important, known polybibenzoates exhibit an extremely high rate of crystallization, making orientation of fibers or films therefrom extremely difficult and costly, if not impossible, from a commercial standpoint.

This invention overcomes these limitations in providing as one of its objects new and useful highly polymeric interpolyesters of a glycol, bibenzoic acid and another aromatic acid having valuable properties, including those of being capable of being formed into useful filaments, films, and the like. It is a further object of this invention to provide unique interpolyesters as described above which possess melting points and rates of crystallizaion which make them amenable to the preparation of new and useful fibers, films, molded products, coatings other shaped articles and the like. A still further object is the provision of unique interpolyesters having a low degree of solubility in organic solvents. A further object is the provision of new and useful synthetic filaments and films possessing improved moisture regain characteristics. Another object is the provision of new and useful synthetic fibers, film and molded objects having improved dyeing characteristics. A still further object is the provision of a new process for making the unique interpolyesters of this invention. Other objects will appear hereinafter.

The synthetic products according to the present invention are difficultly soluble, usually crystallizable, orientable, highly polymerized interpolyesters of (1) bibenzoic acid, having the genueral formula:

(2) an aromatic acid having the general formula:

$$HOOC-(CH_2)_m-Ar-(CH_2)_n-COOH$$

wherein $m$ and $n$ are the same or different integers of from 0 to 8 and Ar is a bivalent mononuclear arylene radical, a bivalent fused-ring polynuclear arylene radical (e.g., naphthylene, anthrylene, phenanthrylene, etc.), or the bivalent radical:

$$-Ar'-R-Ar'-$$

wherein Ar' is the same as Ar defined above and R is a straight or branched chain bivalent aliphatic hydrocarbon radical containing 1 to 10 carbon atoms or a bivalent alicyclic radical containing 4 to 6 nuclear carbon atoms, all of the bivalent aromatic and alicyclic radicals being either non-substituted or lower alkyl-substituted (i.e., 1 to 8 carbon atoms in the alkyl chain), and (3) a glycol or dihydric alcohol selected from the group consisting of one having the general formula $$HO-Z-OH$$

wherein Z represents the radicals intermediate the hydroxyl groups of the following glycols:

(A) $$HO-R-OH$$

wherein R is a bivalent straight or branched chain aliphatic hydrocarbon radical containing 2 to 20 carbon atoms, or (B) $$HO-(R'X)_n-R'OH$$

wherein R' is a bivalent straight or branched chain aliphatic hydrocarbon radical containing 2 to 10 carbon atoms, X is an ether oxygen or sulfone and $n$ is an integer from 1 to 6, or (C) $$HO-(CH_2)_m-Ar-(CH_2)_m-OH$$

wherein Ar is a mono- or di-nuclear aromatic hydrocarbon radical containing 6 to 12 nuclear carbon atoms and $m$ is an integer from 1 to 4, or (D) $$HO-(R'X)_n-(CH_2)_p-Ar$$
$$-(CH_2)_p-(XR')_n-OH$$

wherein R', X and $n$ are the same as in (B), Ar is the same as in (C), and $p$ is an integer from 0 to 4, or (E) $$HO(CH_2)_p-R''-(CH_2)_p-OH$$

wherein R'' is an alicyclic hydrocarbon radical containing 4 to 6 carbon atoms and $p$ is the same as in (D), or (F) $$HO-(R'X)_n-(CH_2)_p-R''$$
$$-(CH_2)_p-(XR')_n-OH$$

wherein R', X and $n$ are the same as in (B), $p$ is the same as in (D), and R'' is the same as in (E).

The polyesters of the present invention possess, among others, the following superior fiber and film properties: (1) controlled melting points over a relatively wide range, i.e. above 140° C., preferably 200°–270° C., (2) toughness, (3) controlled crystallizability dependent upon thermal and orienting treatment, (4) orientability, (5) pliability, and (6) lack of color. Items (1) and (3) are important in order that the fiber or film have good thermal and dimensional stability, as well as orientability, under a variety of conditions. The advantages of toughness, pliability and lack of color are readily apparent. In order that these latter characteristics be attained, the fiber or film forming polymer must not crystallize too rapidly; otherwise it will not be possible to properly orient it. In other words, it must be capable of being easily converted to an amorphous form which can be oriented by cold or hot drawing or other known orienting procedures. On the other hand, the fiber or film-forming polymer must have latent ability to crystallize, for if it does not it is then brittle toward impact and possesses poor dimensional stability.

In preparing the unique interpolyesters of this invention bibenzoic acid, or a diester or acid chloride thereof, is reacted with the aromatic dicarboxylic acid described above in (2), or a diester or acid chloride thereof, and one of glycols described above in (3). An ester interchange reaction is generally preferred since the time required to form the interpolyesters of this invention is generally considerably less, and/or side reactions can generally be minimized to a greater degree than when the free dicarboxylic acids are employed.

The ester interchange method for preparing the interpolyesters of this invention proceeds in three stages:

I. One mole of a mixture of a diester of bibenzoic acid and a diester of one of the aromatic acids described above in (2) is reacted in the presence of heat and an ester interchange catalyst with at least two moles of a glycol and a monohydric alcohol is distilled off;

II. The temperature is gradually raised to bring about polymerization and excess glycol is distilled off; and III. Polymerization is driven to completion by gradually reducing the pressure to remove the last traces of glycol.

The overall process is illustrated by the following equations:

(I)

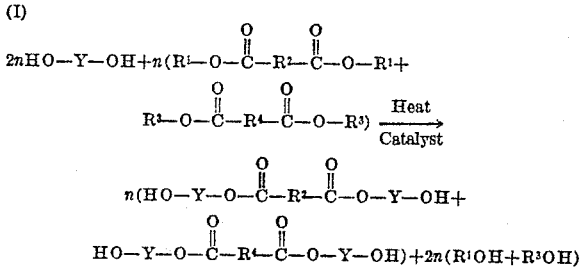

(II and III)

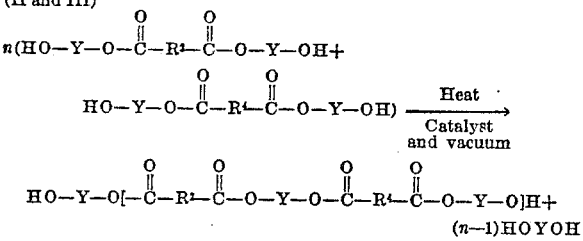

wherein Y is a bivalent hydrocarbon or hetero hydrocarbon radical as described in (A) through (F) above; $R^1$ and $R^3$ are same or different hydrocarbon radicals derived from a straight or branched chain aliphatic primary or secondary monohydric alcohol boiling within the range from about 64° to 215° C.; $R^2$ is hydrocarbon residue of bibenzoic acid and $R^4$ is the hydrocarbon residue of one of the aromatic acids described above in (2).

In a preferred embodiment of this invention, the mixture of monomeric diesters described above (in a ratio of 40 to 90 mole percent of a bibenzoate and 60 to 10 mole percent of another aromatic dicarboxylate) and a glycol are weighed into a vessel, the ester interchange catalyst added, and a boiling chip introduced. Stage I ester interchange is then carried out at atmospheric pressure under nitrogen at a temperature between about 150° and 225° C. (preferably 175° to 200° C.) for about 2 to 10 hours, distilling off monohydric alcohol. Polymerization is then brought about in stage II by raising the temperature gradually to between about 200° and 400° C. (preferably about 260° to 290° C.) over a period of about ½ to 2 hours, continuing polymerization for a period of about ½ to 3 hours at this temperature and distilling off excess glycol. In stage III pressure is gradually reduced to below about 5 mm. (preferably 0.2 to 0.5) over a period of about ½ to 4 hours (preferably about 1 to 2 hours), followed by continued heating at this elevated temperature and reduced pressure for a period of about 2 to 10 hours. In this latter step the last traces of the glycol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time will be employed. In those cases where the polymer is solidified, or begins to solidify before it is apparent all glycol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under these conditions in stage III, evacuation and heating are discontinued, an inert gas admitted, the vessel allowed to cool to approximately room temperature and the polyester removed.

In theory a total of only one mole of the glycol is necessary to effect complete polyesterification with one mole of the mixed monomeric diesters of bibenzoic acid and the other aromatic acid. However, in practice, it is difficult to attain complete reaction under these conditions. It is therefore usually necessary to utilize an excess of the glycol, preferably at least two moles of glycol to one mole of mixed diesters. Quantities, substantially larger than about 2 moles of the glycol may be used; however, since they are not necessary, in the interests of economy, they are not recommended.

Examples of some of the various monomeric diesters which can be employed in accordance with the process of the invention include those derived from bibenzoic acid, the aromatic acids described above in (2) and one of the following primary monohydric alcohols: methanol, ethanol, propanol-1, 2-methyl-propanol-1, butanol-1, 2-methyl-butanol-4, 2,2-dimethyl propanol-1, pentanol-1, 2-methyl-pentanol-1, 2-methyl-pentanol-5, 3-methylol-pentane, hexanol-1, 2-methyl-hexanol-1, 2-methyl-hexanol-1, 2-methyl-hexanol-6, heptanol-1, 2-ethyl-hexanol-1, octanol-1, nonanol-1, 2,6dimethyl-3-methylol heptane. Diesters derived from these same acids and secondary monohydric alcohols can be utilized also, e.g. propanol-2, butanol-2, 2-methyl-butanol-3, pentanol-2, pentanol-3, 2-methyl-pentanol-3, 3-methyl-pentanol-2, hexanol-2, 2,2-dimethyl-butanol-3, 2-methyl-hexanol-3, heptanol-4, octanol-2, decanol-4.

Since in the preferred process, the alcohols from which the diesters are derived are removed from the reaction zone by boiling, it is generally necessary to utilize a glycol having a boiling point higher than that of the alcohol being evolved. Examples of some of the glycols described in (A) through (F) above are as follows:

(A) Ethylene, trimethylene, tetramethylene, pentamethylene, hexamethylene, decamethylene glycols, 2,2-dimethyl-1,3-propanediol, 2,2,3,3-tetramethyl-1, 4-butanediol, 2-buten-1,4-diol, 2-hexen-1,6-diol, 3-octen-1,8 diol, 2,2,5,5-tetramethyl-3-hexene-1,6-diol, etc.;

(B) Diethylene glycol, triethylene glycol, tetraethylene glycol, dipropylene glycol, 4,4'-dihydroxy-dibutyl ether, other polyoxyalkylene glycols having 1 to 6 oxyalkylene units wherein said oxyalkylene unit contains 1 to 10 carbon atoms, 2,2'-sulfonyl-diethanol,
4,4'-sulfonyl-dibutanol,
3,3'-[sulfonyl-bis-(3 propyl-sulfonyl)]-dipropanol,
4,4'-[1,4-butylene-disulfonyl-bis-(4-butyl-sulfonyl)]-dibutanol, sulfonyl-bis-(4-butyl-sulfonyl-4-butyl-sulfonyl-4-butanol),
6,6'-(1,6-hexylene disulfonyl)-dihexanol,
sulfonyl-bis-[3-(2,2-dimethyl)-propanol],
1,3-(2,2-dimethyl)-propylene-disulfonyl-bis-[3-(2,2-dimethyl)-propyl-sulfonyl-3-(2,2-dimethyl)-propanol],
sulfonyl-bis-[4-(2,2,3,3-tetramethyl)-butanol], etc.;

(C) p-Xylylene glycol,
3,6-bis-(hydroxymethyl)-durene,
4,4'-bis-(hydroxymethyl)-biphenyl,
2,6-bis-(hydroxymethyl)-naphthalene,
1,5-bis-(γ-hydroxypropyl)-naphthalene,
1,4-bis-(β-hydroxyethyl)-benzene,
1,4-bis-(γ-hydroxypropyl)-benzene,
3,6-bis-(β-hydroxyethyl)-durene, etc.;

(D) 2,2'-(p-phenylene-dioxy)-diethanol,
3,3'-(p-xylylenedioxy)-dipropanol,
4,4'-(p-phenylene-disulfonyl)-dibutanol,
6,6'-(p-xylylene-disulfonyl)-dihexanol,
2,2'-(4,4'-biphenylene-dioxy)-diethanol,
(1,5-naphthalene disulfonyl)-dimethanol, etc.;

(E) 1,4-cyclohexane-β,β'-diethanol, 1,4-cyclohexane-δ,δ'-dibutanol, the dihydric alcohol derived from α-pinene having the formula:

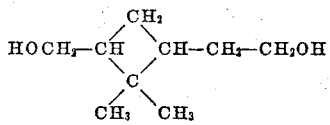

etc.;

(F) 1,4-cyclohexane-dioxy-β,β'-diethanol,
1,4-cyclohexane-disulfonyl-β,β'-diethanol,
1,4-cyclohexane-β,β'-diethoxy-β,β'-diethanol,
1,4-cyclohexane-bis-(γ-propoxy-γ-propoxy-γ-propanol),

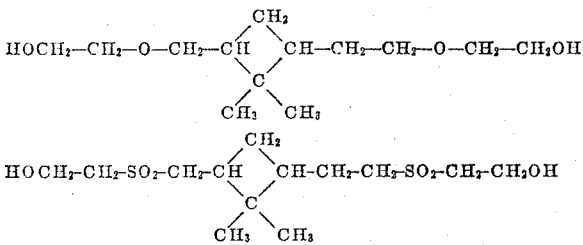

etc.

Illustrative of some of the acids described in (2) useful for this invention are the following: terephthalic acid, isophthalic acid, p-phenylene-diacetic acid, 2,6-naphthalene-dicarboxylic acid, 1,5-naphthalene-dicarboxylic acid, 2,5-dimethyl-terephthalic acid, 2,6-dimethyl-terephthalic acid, bis-(p-carboxyphenyl)-methane, 1,2-bis-(p-carboxyphenyl)-ethane, 1,3-bis-(p-carboxyphenyl)-propane homoterephthalic acid (i.e., 4-carboxymethyl benzoic acid), 1,4-bis-(m-carboxyphenyl)-butane, 2,2-bis-(p-carboxyphenyl)-propane.

The properties of films, fibers, or other molded objects which constitute a preferred embodiment of this invention vary greatly depending in a large measure upon the identity of the glycol utilized to form the interpolyester. Thus melting points, degree of crystallinity, rate of crystallizing, etc. will vary considerably. Interpolyesters formed from different glycols within any one of the groups (A) through (F) above will generally be substantially similar to one another in their properties. On the other hand, those formed from different glycols chosen from different groups may vary greatly in their properties. In a like manner, the quantity, and, to a lesser degree, the identity of the acid described above in (2) can cause substantial variation in the properties of the interpolyesters of this invention. Accordingly, although the use of bibenzoic acid in a quantity in the range of 40 to 90 mol percent is generally satisfactory, a range of 50 to 80 mole percent is generally preferred where formation of films or fibers is contemplated.

The catalytic condensing agents are ester-interchange catalyst which may be employed are conventional ones and include, for example, the alkali metals, the alkaline earth metals; the oxides, carbonates, and borates of these two groups of metals, the one to six carbon alkoxides of these two groups of metals; magnesium, zinc, and manganese; the oxides of these metals; zinc borate; the sulfates, phosphates and acetates of zinc, cadmium, magnesium aluminum and copper; litharge or a combination of litharge with antimony trioxide and triphenyl phosphite as described in U.S. Patent No. 2,650,213; compounds of the formula:

wherein M is an alkali metal, e.g., lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium, or zinc as described in U.S. Patent No. 2,681,360.

From about 0.005% to about 0.2% of such catalysts based on the weight of diester monomer being condensed may be employed. Higher or lower percentages may also be employed. Generally, from about 0.01% to about 0.05% of the catalytic condensing agent can be advantageously employed, based on the weight of dibasic acid diester being condensed. As will be apparent to those skilled in the art, it is generally advantageous from a cost standpoint to utilize the minimum quantity of one of the above catalysts which effect optimum results. Obviously, however, quantities larger or smaller than those outlined above will be employed by those skilled in the art where needed, e.g. to accelerate or decelerate rate of reaction, to modify properties—luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc. It is essential to exclude oxygen and moisture at all stages of the condensation reaction. Otherwise discoloration, low molecular weight, and/or insolubilizaton of the polyester results. Inert atmospheres which can advantageously be employed include nitrogen, hydrogen, helium, etc. The exclusion of moisture is readily effected by employing substantially anhydrous reactants.

Although illustrated in the preferred embodiment as a batch process, the interpolyesters of this invention can also be produced by continuous methods; for example, the required amounts of the several reactants and catalyst can be continuously metered into the reaction vessel, maintained therein for the required reaction time under the required reaction conditions of temperature and pressure and then continuously drawn off.

The interpolyesters of this invention can be formed into filaments or films by conventional melt extrusion procedures. For example, the interpolyesters can be melt extruded vertically at a melt temperature of approximately 25° C. above the melting point of the interpolyester coupled with immediate quenching with subsequent orientating.

The following examples are not given by way of limitation, the scope of the invention being determined by the appended claims.

EXAMPLE 1

*Polyethylene bibenzoate terephthalate, 50/50 mol percent*

A glass polymerization vessel fitted with an exit tube, water cooled condenser and a water cooled receiver was charged with 6.75 grams (0.025 mole) dimethyl bibenzoate, 4.85 grams (0.025 mole) dimethyl terephthalate and 11.2 ml. (0.200 mole) ethylene glycol. To this mixture were added 0.0135 g. zinc acetate and 0.0135 g. manganous acetate as a mixed catalyst for ester interchange and a boiling chip to prevent bumping during subsequent heating. The glass vessel was evacuated and flushed with oxygen-free nitrogen four times prior to heating. The polymerization vessel was heated rapidly to 195° C. during which time the reactants melted with rapid evolution of methanol. The initial ester interchange to produce the mixed glycol esters was carried out at 195° C. for 3 hours to assure complete conversion to the desired products. Under these interchange conditions the product was a very thin mobile clear liquid which on cooling solidified to white opaque pasty solids. The vessel was gradually heated to 250° over a three hour period with distillation of ethylene glycol. The polymerization temperature was maintained at 250° C. while the pressure was gradually reduced over a one hour period to 0.2 mm. The polymerization was continued under these conditions of temperature and pressure for an additional 4.5 hours. The polymer thus produced was a very viscous light colored liquid which crystallized to a white opaque hard solid on cooling. The polymer had a birefringent melting point of 215–220° C. and formed fibers and transparent flexible films which were quite strong and tough after orientation. Films formed from this polymer adhered tenaciously to glass and to metals. The coated thin metal products could be repeatedly flexed with no evidence of failure of the coating film.

EXAMPLE 2

*Polyethylene bibenzoate terephthalate, 60/40 mol percent*

A stainless steel polymerization vessel fitted with a nitrogen inlet, condenser and receiver charged with 357.6 g. of diethyl bibenzoate, 155.2 g. of dimethyl terephthalate, 310 g. of ethylene glycol and 1.026 g. of catalyst comprising an equal amount of litharge and cobaltous acetate was heated at 190–197° C. for 6 hours resulting in the evolution of 207.5 ml. of mixed alcohols. The temperature was then gradually raised to 277° C. and held at this temperature for approximately 3 hours resulting in a recovery of 132 ml. of ethylene glycol. The polymerization temperature was raised to 295° C. and the pressure reduced to 1 mm. over a one hour period. The polymerization was continued at this temperature and pressure for 3.5 hours with recovery of an additional 21 ml. of ethylene glycol. On cooling, the polymer solidified to a very hard crystalline mass which broke away from the highly polished walls of the polymerization vessel and was easily removed. The intrinsic viscosity of this polymer in a 60–40 tetrachloroethanephenol solvent was 0.78 and the melting point was 258° C. The polymer formed fibers by conventional melt spinning techniques which could be oriented to give strong fibers which were readily dyeable with dispersed dyes. Strong flexible oriented films with excellent clarity and brilliance could be formed from this polymer.

EXAMPLE 3

*Polyethylene bibenzoate terephthalate, 62.5/37.5 mol percent*

A glass polymerization vessel fitted with a nitrogen inlet, condenser and receiver was charged with 8.438 g. (0.03125 mole) of dimethyl bibenzoate, 3.638 g. (0.01875 mole) dimethyl terephthalate, 11.2 ml. (0.20 mole) ethylene glycol and 0.0270 g. catalyst composed of equal amounts of zinc acetate and manganese acetate. After the usual precautions to remove oxygen the initial ester interchange was accomplished at 197° C. for 4 hours and the temperature of the condensation increased to 278° C. over a one hour period. The pressure was gradually reduced to less than 0.2 mm. over one hour and maintained under these conditions for 2.5 hours. The polymer was a very viscous light tan colored liquid which quickly solidified on cooling to a crystalline cream colored solid. The polymer melted at 265–270° C. and formed fibers and films which could be oriented to give products with excellent physical properties.

EXAMPLE 4

*Polyethylene bibenzoate terephthalate, 70/30 mol percent*

A stainless steel polymerization vessel charged with 417.2 g. diethyl bibenzoate, 116.4 g. dimethyl terephthalate, 310.0 g. ethylene glycol and 1.067 g. of 50–50 wt. percent litharge-cobaltous acetate catalyst was heated at 195° C. for 6 hours. The temperature was then raised to 295° C. to remove ethylene glycol. As the distillation of ethylene glycol continued the melt gradually solidified and the temperature of the heating bath was gradually raised to 310° C. The polymerization was continued at this temperature under less than 1 mm. pressure for 2 hours at which point the condensation was interrupted. The molten polymer quickly crystallized on cooling and had a melting point of 280° C. The polymer formed fibers and films of excellent quality.

EXAMPLE 5

*Polydiethylene bibenzoate isophthalate, 80/20 mol percent*

A polymerization vessel fitted with an exit tube, water cooled condenser and a water cooled receiver was charged with 14.32 grams (0.048 mole) diethyl bibenzoate, 2.33 grams (0.012 mole) dimethyl isophthalate and 14.00 grams (0.132 mole) diethylene glycol. To this mixture were added .01 g. zinc acetate and .01 g. manganous acetate as a mixed catalyst for ester interchange and a boiling chip to prevent bumping during subsequent heating. The polymerization vessel was evacuated and flushed with oxygen-free nitrogen 3 times prior to heating, then heated rapidly to 180° C. during which time the reactants melted with rapid evolution of methanol and ethanol. The initial ester interchange to produce the mixed glycol esters was carried out at 180° C. for 7 hours to assure complete conversion to the desired products resulting in thin mobile clear liquid which on cooling solidified to white opaque solids. The vessel was gradually heated to 260° C. over a 1 hour period with distillation of diethylene glycol. The polymerization temperature was maintained at 260° C. while the pressure was gradually reduced over a 1 hour period to 0.2 mm. and polymerization continued under these conditions for an additional 5 hours. The polymer thus produced was a straw colored liquid which crystallized to a buff opaque solid on cooling. The polymer had a birefringent melting point of 125° C. and formed fibers and transparent flexible films which were quite strong and tough after orientation.

EXAMPLE 6

*Polydiethylene bibenzoate/terephthalate, 70/30 mol percent*

A polymerization vessel fitted with an exit tube, water cooled condenser and a water cooled receiver was charged wtih 12.52 grams (0.042 mole) diethyl bibenzoate, 3.49 grams (0.018 mole) dimethyl terephthalate and 14.00 g. (0.132 mole) diethylene glycol. To this mixture were added 0.01 g. zinc acetate and 0.01 g. manganous acetate and 0.005 g. lithium hydride as a mixed catalyst for ester interchange and a boiling chip to prevent bumping during subsequent heating. The polymerization vessel was evacuated and flushed with oxygen-free nitrogen 3 times prior to heating, then heated rapidly to 160° C. during which time the reactants melted with rapid evolution of alcohols. The initial ester interchange to produce the mixed glycol esters was carried out at 160° C. for 1.75 hours to assure complete conversion to the desired products resulting in thin mobile clear liquids which on cooling solidified to white opaque pasty solids. The vessel was gradually heated to 180° C. over a 3 hour period with distillation of diethylene glycol. The polymerization temperature was maintained at 260° C. while the pressure was gradually reduced over a 1 hour period to less than 1 mm. and polymerization continued under these conditions for an additional 3.5 hours. The polymer thus produced was a viscous tan colored liquid which crystallized to a buff opaque tough solid on cooling. The polymer had a birefringent melting point of 115–123° C. and formed fibers and transparent flexible films which were quite strong and tough after orientation.

EXAMPLE 7

*Polyethylene bibenzoate/2,6-naphthalene-dicarboxylate, 50/50 mol percent*

A polymerization vessel, provided with a side arm and receiver for distillation, was charged with 4.47 grams (0.015 mole) diethyl bibenzoate, 4.08 grams (0.015 mole) 2,6 dicarbethoxy-naphthalene and 4.10 grams (0.066 mole) of ethylene glycol. As catalyst was added 0.01 gram of a 50–50 weight-percent mixture of litharge and cobaltous acetate. A slow stream of purified nitrogen, admitted by means of a capillary, was used to promote smooth boiling. The reaction mixture was heated at 190° C. for 4 hours, during which time ethanol distilled. The temperature was then raised to 275° over a period of one hour, during which time most of the ethylene glycol distilled. After an additional half-hour, evacuation of the polymerization vessel was started, and the pressure was reduced to 0.4 mm. over a period of one hour. Heating was then continued at 275° and 0.4 mm. for 5 hours. The product was an opaque solid which had a crystalline melting point of 271° C. It could be formed into filaments and transparent films, which after drawing were tough and had high tensile strength.

EXAMPLE 8

*Polyethylene bibenzoate/isophthalate, 60/40 mol percent*

The procedure and catalyst were the same as in Example 7. The quantities of reactants were 17.90 grams (0.06 mole) diethyl bibenzoate, 7.77 grams (0.04 mole) dimethyl isophthalate, and 13.66 grams (0.22 mole) ethylene glycol. The product was an opaque solid which melted at 238° C. and formed filaments and transparent, flexible films.

EXAMPLE 9

*Polyneopentylene bibenzoate/terephthalate, 80/20 mol percent*

The procedure was similar to that employed in Example 7. The quantities of reactants were 14.32 grams (0.048 mole) diethylbibenzoate, 2.33 grams (0.012 mole) dimethyl terephthalate, and 13.75 grams (0.132 mole) neopentylene glycol. Catalyst was 0.02 gram of 20–40–40 wt. percent lithium hydride, zinc acetate, manganous acetate. The product was a light-yellow colored, transparent solid, which formed rods, sheets, and molded articles.

EXAMPLE 10

*Polydecamethylene bibenzoate/terephthalate, 70/30 mol percent*

The procedure was similar to that of Example 7. The quantities of reactants were 12.52 grams (0.042 mole) diethyl bibenzoate, 3.49 grams (0.018 mole) dimethyl terephthalate, and 23.00 grams (0.132 mole) decamethylene glycol. Catalyst was 0.02 gram of 20–40–40 wt. percent mixture of lithium hydride, zinc acetate, and manganous acetate. The product was a white opaque solid which melted at 143° C. and formed strong filaments and films.

EXAMPLE 11

*Polyneopentylene bibenzoate/isophthalate, 80/20 mol percent*

The procedure was similar to that employed in Example 7. The quantities of reactants were 14.32 grams (0.048 mole) diethyl bibenzoate, 2.33 grams (0.012 mole) dimethyl isophthalate, and 13.75 grams (0.132 mole) neopentylene glycol. Catalyst was 0.02 gram of 20–40–40 wt. percent mixture of lithium hydride, zinc acetate, and manganous acetate. The product was a yellow colored transparent solid having an intrinsic viscosity of 0.6 (determined using 40–60 wt. percent phenol-tetrachlorethane as a solvent) which formed tubes, rods, sheets, and molded articles.

EXAMPLE 12

*Polyethylene bibenzoate/terephthalate, 40/60 mol percent*

A glass polymerization vessel was charged with 5.95 g. diethyl bibenzoate, 5.82 g. dimethyl terephthalate, 11.2 ml. ethylene glycol and 0.027 g. of 50–50 weight percent litharge-cobaltous acetate catalyst. Under the polymerization conditions of the earlier examples the mixed alcohols were completely removed after heating at 190° C. for 3 hours. The condensation of the glycol esters of the mixed acids was accomplished at 275° C. for 3 hours at a pressure of less than 1 mm. to give a viscous liquid which did not crystallize on cooling. However, subsequent annealing at 140° C. for 2 hours gave a crystalline polymer with a melting point of 190° C. Films from this polymer adhered strongly to glass and thin metal articles of copper, aluminum and other metals coated with this polymer could be flexed repeatedly with no damage to the coating.

EXAMPLE 13

*Polyhexamethylene bibenzoate/isophthalate, 60/40 mol percent*

A mixture of 8.94 g. diethyl bibenzoate, 3.88 g. dimethyl isophthalate, 12.98 g. hexamethylene glycol and 0.015 g. lithium hydride was reacted at 187° C. for 2 hours with distillation of alcohols. The temperature was raised to 280° C. and the pressure gradually reduced over a three hour period to 1 mm. and the polymerization completed under these conditions by heating for an additional 4 hours. The crystalline light colored solid so produced formed filaments which could be easily oriented to give strong fibers.

EXAMPLE 14

A polymerization vessel fitted with an exit tube, water cooled condenser and a water cooled receiver is charged with 10.05 grams (0.036 mole) bibenzoyl chloride, 4.86 grams (0.024 mole) terephthaloyl chloride and 11.88 g. (0.06 mole) 2,2'-(p-phenylene-dioxy)-diethanol. To this mixture is added 20 ml. of dry o-dichlorobenzene as a solvent. The polymerization vessel is flushed with oxygen-free nitrogen and is heated to 140° C. for 6 hours with evolution of hydrogen chloride. The polymer slurry is diluted with 200 ml. of dry o-dichlorobenzene and filtered to remove the polymer. The latter is washed with acetone until the filtrate is acid free and is then dried at 110° C. The fine white polymer gives very sharp X-ray diffraction patterns and can be melt spun into fibers or melt extruded in the form of flat films.

EXAMPLE 15

A polymerization vessel fitted with an exit tube, water cooled condenser and a water cooled receiver was charged with 6.69 grams (0.024 mole) bibenzoyl chloride, 7.31 grams (0.036 mole) terephthaloyl chloride and 8.29 g. (0.06 mole) p-xylylene glycol. To this mixture were added 20 ml. of dioxane as a solvent. The polymerization vessel was flushed with oxygen-free nitrogen and heated at reflux temperature for 5 hours with evolution of hydrogen chloride. The resulting slurry was diluted with 200 ml. of dioxane and the precipitated polymer isolated by filtration. The polymer was washed with acetone and dried at 110° C. The polymer thus produced was a white fine powder with a birefringent melting point of 205° C. and formed fibers and films.

EXAMPLE 16

A polymerization vessel fitted with an exit tube, water cooled condenser and a water cooled receiver is charged with 10.05 grams (0.036 mole) bibenzoyl chloride, 4.86 grams (0.024 mole) terephthaloyl chloride and 6.97 g. (0.06 mole) cis-1,4-quinitol. To this mixture is added 20 ml. of dry o-dichlorobenzene as a solvent. The polymerization vessel is flushed with oxygen-free nitrogen and is heated to 140° C. for 6 hours with evolution of hydrogen chloride. The polymer slurry is diluted with 200 ml. of dry o-dichlorobenzene; the precipitated polymer is recovered by filtration, washed with acetone and dried at 110° C. The fine white crystalline polymer can be formed into fibers and films by conventional melt extrusion techniques.

In some instances it is not practicable to utilize the ester interchange method described above to prepare the interpolyesters of this invention. Accordingly, another preferred embodiment in the present invention involves the reaction of a mixture of diacid chlorides and a glycol. According to this embodiment, interployesters are prepared by mixing substantially molecular equivalent quantities of the glycol and the two dibasic acid chlorides. In some cases it is preferred to add the glycol to the mixture of dibasic acid chlorides in successive portions at a rate such that there is no appreciable accumulation of unreacted glycol. However, it is generally sufficient to merely mix the three reactants in a single step. If one or the other of the reactants is a solid at room temperature, it may be necessary to warm the mixture or to use a solvent in order to bring about complete solution of the reactants. The working examples herein, it will be noted, utilize both of these expedients, since the use of a solvent and an elevated temperature is the preferred mode of operation. In this intitial step, if an elevated temperature is utilized, it is generally only necessary to heat to a reflux temperature.

During this inital step, rapid and copious evolution of hydrogen chloride takes place and is usually accompanied by spontaneous rise in temperature. After the bulk of the hydogen chloride has evolved, the mixture is then warmed gradually to a temperature in excess of about 200° C. accompanied generally by removal of the solvent by distillation. At times, it is preferable to utilize reduced pressure, i.e., below about 5 mm. of mercury, in conjunction with the second heating step in order to affect adequate polymerization to produce satisfactory molecular weights.

It is necessary in the diacid chloride method of preparing the interpolyesters of this invention to guard against there being any substantial excess of glycol in the final product. In a preferred embodiment, it is generally desirable for the polymer to posses a molecular weight of 10,000 or greater. Accordingly, it is generally necessary to prevent the inclusion of more than about a one percent excess of glycol in the finished product. On the other hand, it is sometimes possible to produce some of the interpolyesters of this invention wherein the final product may contain as much as a 2½% excess over the molecular equivalent amount. This does not mean necessarily that the glycol in the reactants as charged should not exceed either of these limitations (i.e. either 1% or 2½% excess), for it has been observed that at times, small amounts of the glycol may be lost by volatilization, entrapment, etc. Thus, simply by observation, the optimum quantity to be charged can be determined from the optimum quantities found in the finished product.

We claim:

1. A filament and film forming linear interpolyester melting above 140° C. of components consisting essentially of a mixture of dicarboxylic acids and at least two mols per mol of mixed acids of a glycol having the following general formula:

$$HO-Z-OH$$

wherein Z is a radical selected from the group consisting of $-R-$, $-(R'O)_n-R'-$, $-(CH_2)_m-Ar-(CH_2)_m-$, $-(R'O)_{n'}-(CH_2)_p-Ar-(CH_2)_p-(OR')_{n'}-$, and $-(CH_2)_p-R''-(CH_2)_{p'}-$, wherein R is a bivalent aliphatic hydrocarbon radical containing 2 to 20 carbon atoms, R' is a bivalent aliphatic hydrocarbon radical containing 2 to 10 carbon atoms, R'' is a saturated alicyclic hydrocarbon radical containing 6 carbon atoms, n is an integer of from 1 to 6, n' is an integer of from 1 to 2, m is an integer of from 1 to 4, and p and p' are integers of from 0 to 2; said mixture of acids consisting essentially of from 40 to 90 mol percent of p,p'-bibenzoic acid and from 60 to 10 mol percent of an aromatic acid having the following general formula:

$$HOOC-Ar-COOH$$

wherein Ar is from the group consisting of mono-nuclear arylene radicals and fused ring poly-nuclear arylene radicals.

2. The filament and film forming linear interpolyester of claim 1 wherein the mixture of acids consists essentially of from 50 to 80 mol percent of p,p'-bibenzoic acid and 50 to 20 mol percent of said aromatic acid.

3. The process of preparing filament and film forming linear interpolyesters melting above 140° C. which comprises reacting components consisting essentially of a mixture of lower alkyl diesters of dicarboxylic acids and at least two mols per mol of mixed acids of a glycol having the following general formula $$HO-Z-OH$$

wherein Z is a radical selected from the group consisting of $-R-$, $-(R'O)_n-R'-$, $-(CH_2)_m-Ar-(CH_2)_m-$, $-(R'O)_{n'}-(CH_2)_p-Ar-(CH_2)_p-(OR')_{n'}-$, and $$-(CH_2)_p-R''(CH_2)_{p'}-$$

wherein R is a bivalent aliphatic hydrocarbon radical containing 2 to 20 carbon atoms, R' is a bivalent aliphatic hydrocarbon radical containing 2 to 10 carbon atoms, R'' is a saturated alicyclic hydrocarbon radical containing 6 carbon atoms, n is an integer of from 1 to 6, n' is an integer of 1 to 2, m is an integer of from 1 to 4, and p and p' are integers of from 0 to 2; said mixtures of diesters consisting essentially of from 40 to 90 mol percent of the diester of p,p'-bibenzoic acid and from 60 to 10 mol percent of the diester of an aromatic acid having the following general formula $$HOOC-Ar-COOH$$

wherein Ar is from the group consisting of mono-nuclear arylene radicals and fused ring poly-nuclear arylene radicals, said reaction taking place at a temperature above 150° C. in the presence of an ester-interchange catalyst and in the absence of oxygen and moisture.

4. The process of claim 3 wherein the initial reaction temperature is kept from 150 to 225° C. until no further alcohol is liberated and thereafter the temperature is raised to from 200 to 400° C. with a gradual reduction of reaction pressure to less than 5 mm. of mercury.

5. The process of claim 4 wherein the initial temperature ranges from 175 to 200° C., the temperature is raised to from 260 to 290° C. and the pressure is reduced to from 0.2 to 0.5 mm. of mercury.

References Cited in the file of this patent

UNITED STATES PATENTS

| | | |
|---|---|---|
| 2,437,046 | Rothrock et al. | Mar. 2, 1948 |
| 2,720,503 | Wellman | Oct. 11, 1955 |
| 2,721,854 | Kohl | Oct. 25, 1955 |

OTHER REFERENCES

Page 331, Bennett, Concise Chemical and Technical Dictionary, published 1957, Chemical Publishing Co., Inc., Brooklyn, N.Y.

UNITED STATES PATENT OFFICE
CERTIFICATION OF CORRECTION

Patent No. 3,008,934            November 14, 1961

Edward A. Wielicki et al.

It is hereby certified that error appears in the above numbered patent requiring correction and that the said Letters Patent should read as corrected below.

Column 1, line 59, for "crystallizaion" read -- crystallization --; line 61, after "coatings" insert a comma; column 2, line 4, for "genueral" read -- general --; lines 5 to 7, after the formula insert a comma; same column 2, line 25, after "formula" insert a colon; column 4, lines 46 and 47, strike out "2-methyl-hexanol-1."; line 48, for "2,6dimethyl" read -- 2,6-dimethyl --; column 6, line 69, column 7, lines 30 and 58, and column 8, line 5, for "bibenzoate terephthalate", in italics, each occurrence, read -- bibenzoate/terephthalate --, in italics; same column 8, line 22, for "bibenzoate isophthalate", in italics, read -- bibenzoate/isophthalate --, in italics; column 11, lines 17 and 18, for "interpolysters" read -- interpolyesters --; line 21, for "interployesters" read -- interpolyesters --; line 38, for "inital" read -- initial --; line 41, for "hydogen" read -- hydrogen --; same column 11, line 53, for "posses" read -- possess --; column 12, line 35, after the formula insert a comma.

Signed and sealed this 17th day of April 1962.

(SEAL)
Attest:

ESTON G. JOHNSON
Attesting Officer

DAVID L. LADD
Commissioner of Patents